United States Patent

[11] 3,558,797

| [72] | Inventor | John W. Wolford |
| | | North Madison, Ohio |
| [21] | Appl. No. | 805,621 |
| [22] | Filed | Mar. 10, 1969 |
| [45] | Patented | Jan. 26, 1971 |
| [73] | Assignee | The Grossman Music Corporation |
| | | Cleveland, Ohio |

[54] RECORDER
3 Claims, 13 Drawing Figs.

[52] U.S. Cl. .................................................. 84/384
[51] Int. Cl. .................................................. G10d 7/02
[50] Field of Search .................................. 84/380, 384

[56] References Cited
UNITED STATES PATENTS

| 2,944,459 | 7/1960 | Simmonds .................. | 84/380 |
| 3,198,054 | 8/1965 | Ehrlich ....................... | 84/380 |
| 3,363,497 | 1/1968 | Thompson ................... | 84/380 |

*Primary Examiner*—Richard B. Wilkinson
*Assistant Examiner*—Lawrence R. Franklin
*Attorney*—Sanford Schnurmacher ABSTRACT: A recorder having a free standing wind passage tube in its bell section of uniform wall thickness the length thereof.

INVENTOR.
JOHN W. WOLFORD
BY Sanford Schnurmacher
ATTORNEY.

INVENTOR.
JOHN W. WOLFORD
BY
ATTORNEY.

RECORDER

The recorder, or "block flute," is a basic musical instrument. It is actually the forerunner of the original orchestra flute and dates back to the 13th century.

In order to provide a better understanding of the invention, it may be well to point out that the recorder is made up of four basic sections; namely, a body section, a barrel section, a mouthpiece section, and a bell section, all joined end-to-end through telescopable joints to provide a continuous wind passage.

As made heretofore, the mouthpiece section comprises a beak portion and a vibration box portion having a windway, a bulkhead and a fipple, assembled from a multiplicity of parts, shaped, fitted, and glued together.

Again, the terminal conventional recorder has a bell-shaped configuration with a graceful outward flair, for appearance's sake.

However, as a result the wall thickness of the terminal end of the wind passage in the bell section is quite massive, having a severe damping effect on the vibrations of the wind passage target that point which adversely affects the tonal brilliance of the instrument.

The primary object of the invention, therefore, is to provide a recorder whose mouthpiece beak and vibration box portions are cast as single monolithic units, requiring no skill in assembling other than the ability to fit the two portions together, end-to-end.

Another object is to provide a recorder having a hollow bell section, with a free standing wind-passage tube therein of uniform wall thickness the length thereof.

These, and other objects of the invention, will become apparent from a reading of the following specification and claims, together with the accompanying drawing, wherein like parts are referred to and indicated by like reference numerals, and wherein:

Figure 1:
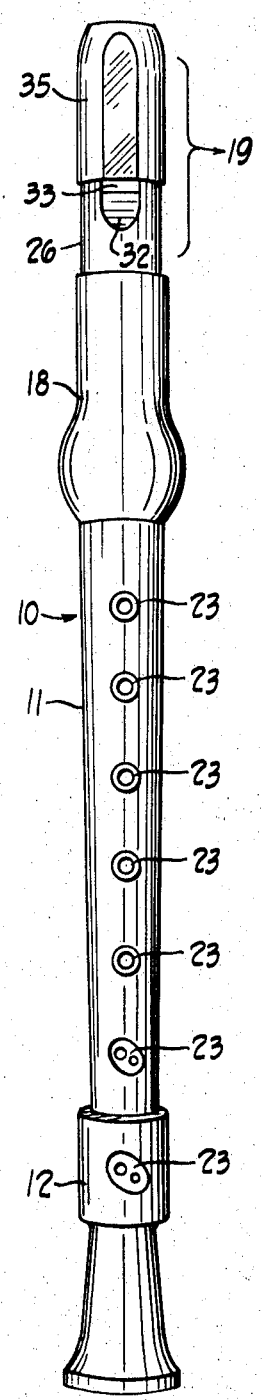
FIG. 1 is a top plan view of the recorder that is the subject of the invention.

Referring more particularly to the drawing, there is seen in FIG. 1 the recorder that is the subject of this invention, broadly indicated by reference numeral 10.

While the recorder has traditionally been made of wood, in the form illustrated here, it is molded from a suitable plastic possessing the acoustical properties required for true recorder sound. The use of plastic provides a recorder that is sanitary, moistureproof, and easily washable.

Figure 3:
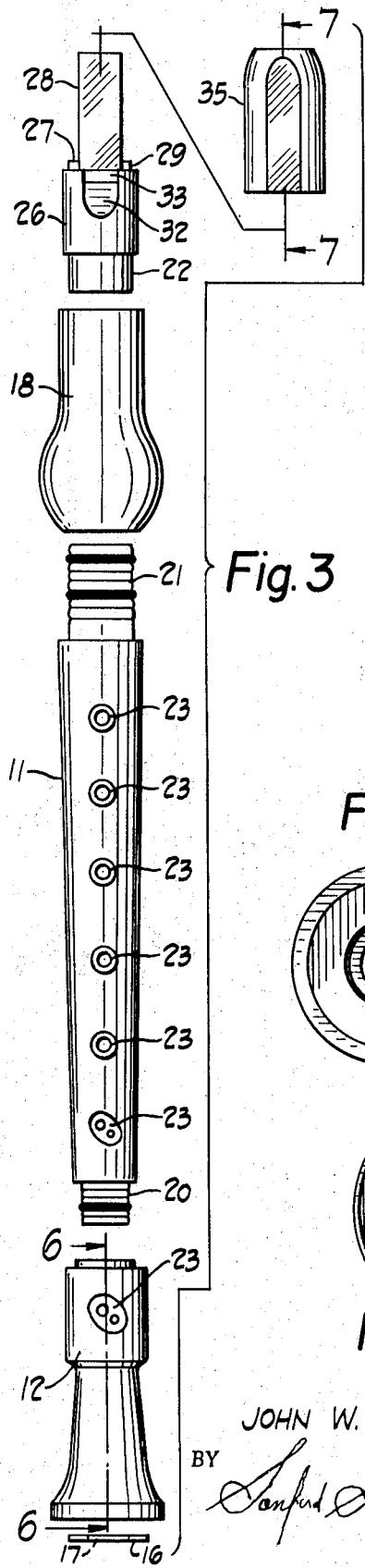
FIG. 3 is an exploded view of the recorder illustrated in FIG. 1.

As seen in FIGS. 1 and 3, the recorder 10 is made up of four sections in the traditional manner, namely, a body 11, a bell 12, a barrel 18, and a mouthpiece 19; all with axial bores therethrough, which, when the several sections are joined end-to-end, form a continuous, straight, wind passage extending from the mouthpiece 19 through the bell 12.

Reference numerals 20, 21 and 22 indicate male joint elements formed integral with, and extending axially of both ends of the body section 11 and the vibration box end of the mouthpiece 19.

Figure 6:
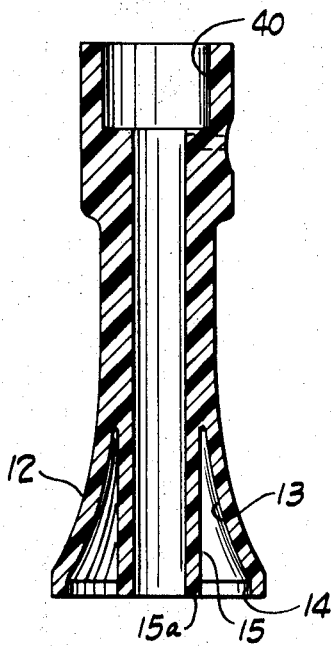
FIG. 6 is a longitudinal sectional view taken along the line and in the direction of the arrows 6–6 of FIG. 3.

The barrel section 18 has female joint elements, or sockets, at both ends thereof, and the bell section 12 has a female joint element 40, as seen in FIG. 6. The several sections are joined together by telescopically inserting the male joint elements into the female joint elements, to provide the assembled instrument seen in FIGS. 1 and 2.

Reference numeral 23 indicates the usual tone holes, which are selectively covered by the fingers in playing the instrument.

Figure 2:
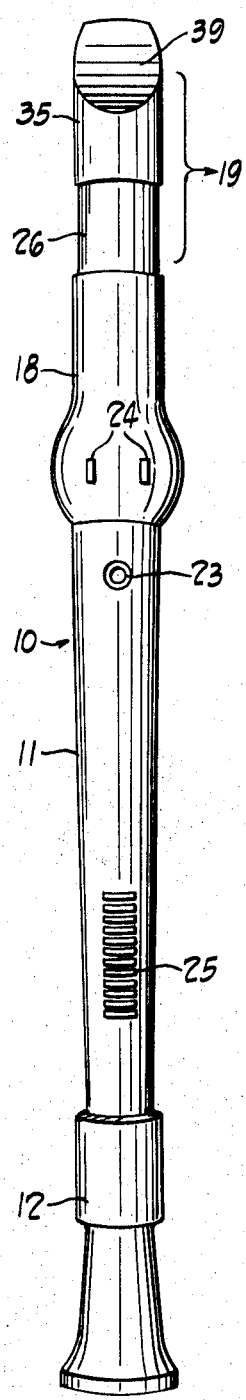
FIG. 2 is a bottom view of the same.

Looking at FIG. 2, reference numeral 24 indicates two spaced and opposed crescent-shaped rests molded into the bottom surface of the barrel section 18, on opposite sides of its centerline, which act to prevent the recorder from rolling when it is placed on a flat surface, such as a desk top or music stand.

The underside of the recorder illustrated in FIG. 2 also has an elongated, ridged, thumb guide 25.

The bell section 12 is flared at its end to provide a graceful terminal end for the recorder. In conventional recorders, as made heretofore, the bell is made solid with a wind-passage bore therethrough. With this construction the terminal wall of the bell wind-passage tube is quite massive, due to its flared configuration, resulting in a damping action on the vibration of the wind-passage tube at its terminal end, which adversely effects the tonal brilliance of the instrument, as stated hereinbefore.

To overcome this inherent defect, I have made the bell 12 hollow, as seen in FIG. 6, with a free standing wind-passage tube 15 centered therein, formed integral therewith, and of uniform wall thickness along its entire length. The so-formed wind passage 15 is free to vibrate uniformly to its terminal end 15a, yielding a rounder tone, with exceptional projection, not possible with conventionally constructed recorders.

Figure 4:
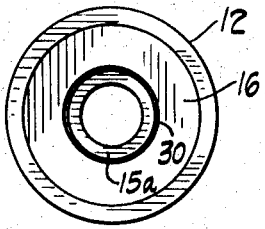
FIG. 4 is a an end view of the bell section of the recorder illustrated in FIG. 1.
Figure 5:
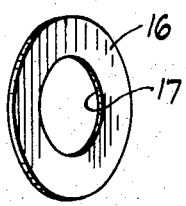
FIG. 5 is a perspective view of the unmounted bell end closure disc.

Reference numeral 16 indicates a closure disc which is mounted at the forward end of the bell 14, as seen most clearly in FIGS. 4, 5, and 6. The disc 16 has a central opening 17 of larger diameter than that of the wind-passage tube 15, so that it clears the tube end 15a, leaving a space 30 therebetween, as seen in FIG. 4. The disc 16 serves to keep dust and dirt out of the bell cavity 13, as well as giving a more finished appearance to the instrument.

The mouthpiece section 19 is made up of two parts, a beak portion 35 and a vibration box portion 26; each portion being a monolithic casting.

Figure 7:
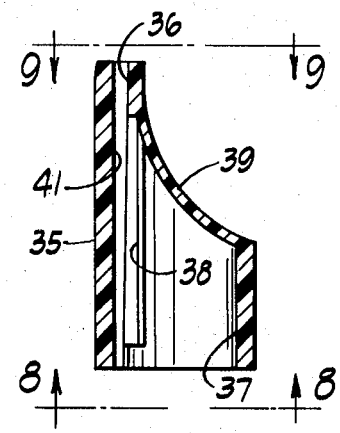
FIG. 7 is a longitudinal sectional view taken along the line and in the direction of the arrows 7–7 of FIG. 3.
Figure 8:
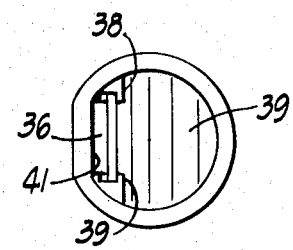
FIG. 8 is an end view of the beak, taken along the line and in the direction of the arrows 8–8 of FIG. 7.
Figure 9:
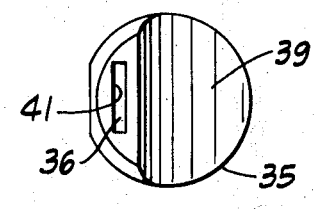
FIG. 9 is an end view of the beak, taken along the line and in the direction of the arrows 9–9 of FIG. 7.

The hollow beak portion 35, as seen in FIGS. 7, 8 and 9, has an air-entry orifice 36 at its forward end and a mounting socket 37 at its other end.

The beak-portion cavity has a concave forward wall 39 adapted to receive the lower lip; continuously curved side and bottom walls; and a flat upper wall 41.

The upper wall 41 is bounded by two dependent, parallel and opposed rails 38 which have inturned flanges along their lower edges, as can be seen most clearly in FIG. 8. The beak top wall 41 and the dependent rails 38 form the top and sides of the windway passage in the beak, to be described hereinafter.

Figure 10:
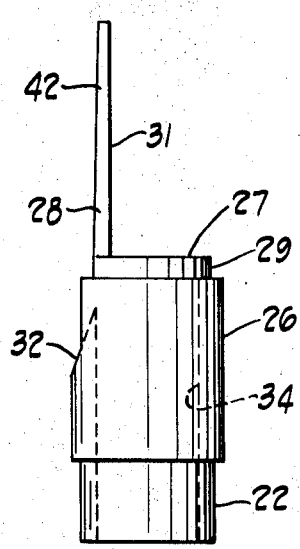
FIG. 10 is a side elevational view of the vibration box portion.
Figure 11:
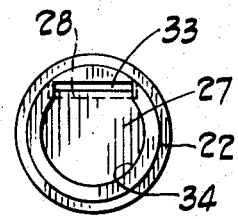
FIG. 11 is an end view of the vibration box, taken along the line and in the direction of the arrows 11 of FIG. 13.
Figure 12:
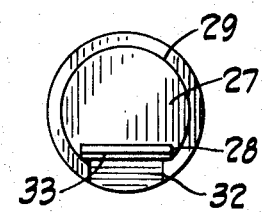
FIG. 12 is an end view of the vibration box, taken along the line and in the direction of the arrows 12–12 of FIG. 13.
Figure 13:
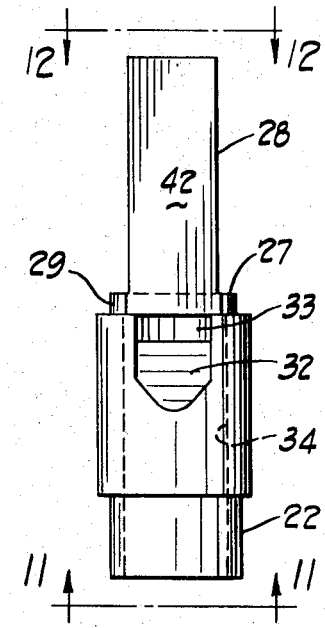
FIG. 13 is a top plan view of the vibration box portion.

The vibration box 26, illustrated in FIGS. 10, 11, 12 and 13, is also a monolithic casting with a vibration chamber 34; a bulkhead 27; a fipple 32; and a windway shelf 28 extending longitudinally outward from the upper edge of the bulkhead 27 in alignment with the fipple 32. The windway shelf 28 has flat upper and lower surfaces 41 and 31, as seen in FIG. 10.

An opening 33 leading into the interior 34 of the vibration box portion 26 is located between the fipple 32 and the windway shelf 28.

The beak and vibration box portions 35 and 26 respectively, are joined together by inserting the windway shelf 28, of the vibration box portion 26, between the beak-portion rails 38 until the beak-portion socket 37 is seated on the male joint element 29 of the vibration box portion 26.

The so mated portions are permanently secured together by a suitable adhesive to form the mouthpiece section 19, which is mounted on the barrel section 18 through its male joint element 22.

The assembled mouthpiece 19 has a windway leading from its air-entry orifice 36 to the fipple 32, having the flat upper wall 41 and the rails 38 acting as side and upper walls, and the upper surface 42 of the shelf 28 serving as its lower wall.

As stated hereinabove, the mouthpiece 19 is fabricated from only two monolithic castings 26 and 35, joined end-to-end; instead of the numerous small, shaped, fitted and glued pieces usually required in the fabrication of a conventional recorder mouthpiece section.

It now will be apparent that there has been provided a device which accomplishes the objectives set forth, as to ease and simplicity of assembly and clarity and brilliance of tone.

I claim:

1. A recorder of the type described, comprising:
   a. a tubular body section provided with a plurality of tone holes disposed generally of the upper side thereof;
   b. a hollow-barrel tuning section;
   c. a mouthpiece section;
   d. a bell section; the several sections being joined, end-to-end, through telescopable male and female joint elements, formed integral with each of said sections, to provide a musical wind instrument of the type described, having a continuous, straight, wind passage; and
   e. the bell section being hollow, with a free standing wind-passage tube centered therein, formed integral therewith, and of uniform wall thickness along its entire length; the forward portion of the wind-passage tube being clear of all contact with the bell structure.

2. A recorder, as in claim 1, wherein the hollow-bell bell section has a closure disc mounted at the forward end thereof; said closure disc having an opening centered therethrough of larger diameter than that of the wind passage tube, providing clearance between the closure disc and the wind-passage tube peripheral wall.

3. A recorder, as in claim 1, wherein the mouthpiece section comprises:
   a. two hollow, cylindrical, beak and vibration box portions joined end-to-end;
   b. the beak portion having a flat inner top wall, bounded by dependent and opposed rails, extending from its air-entry orifice, the length thereof;
   c. the vibration box portion having an end bulkhead, formed integral therewith, and an integral windway shelf extending longitudinally outwardly therefrom;
   d. the beak and vibration box portions being joined end-to-end, with the windway shelf seated between the beak-portion rails, to define a windway leading from the beak air-entry orifice to the vibration box, having the flat upper wall and its bounding rails as upper and sidewalls, and the upper surface of the shelf as its lower wall.